United States Patent [19]
Baillargeon et al.

[11] Patent Number: 6,110,438
[45] Date of Patent: Aug. 29, 2000

[54] METHOD OF MAKING BLACK PHOSPHORUS FROM RED PHOSPHORUS

[75] Inventors: James Nelson Baillargeon, Springfield, N.J.; Keh-Yeng Cheng, Champaign, Ill.; Alfred Yi Cho, Summit; Sung-Nee George Chu, Murray Hill, both of N.J.; Wen-Yen Hwang, Sugar Land, Tex.

[73] Assignee: Lucent Technologies Inc., Murray Hill, N.J.

[21] Appl. No.: 09/270,883

[22] Filed: Mar. 17, 1999

[51] Int. Cl.$^7$ .................................. C01B 25/01; B01J 3/03
[52] U.S. Cl. ............................................ 423/322; 23/293 R
[58] Field of Search ........................... 423/322; 23/293 R

[56] References Cited

U.S. PATENT DOCUMENTS 5,588,969   12/1996   Baillargeon et al. .................... 423/322

OTHER PUBLICATIONS

Ullmann's Encyclopedia of Industrial Chemistry, vol. A19, p. 505–525, 1991.

A comprehensive Treatise on Inorganic chemistry and Theoretical Chemistry, vol. VIII, p. 729–771, 1947.

Primary Examiner—Steven P. Griffin
Assistant Examiner—Maribel Medina
Attorney, Agent, or Firm—Thomas, Kayden, Horstemeyer & Risley LLP

[57] ABSTRACT

The specification describes a method for producing black phosphorus from red phosphorus by thermally cycling red phosphorus in a vacuum between 360–400° C. and 200–240° C., whereupon the red phosphorous undergoes an allotropic phase change to black phosphorus.

7 Claims, 2 Drawing Sheets

METHOD OF MAKING BLACK PHOSPHORUS FROM RED PHOSPHORUS

FIELD OF THE INVENTION

This invention relates to methods for preparation of black phosphorus, primarily for safe handling and storage in conjunction with the manufacture of semiconductor devices.

BACKGROUND OF THE INVENTION

Elemental phosphorus is widely used as a dopant in the manufacture of semiconductor devices, and as an ingredient in III-V compound semiconductor materials, e.g., InP, GaAlP, GaAlAsP. It is a principle precursor material for Molecular Beam Epitaxy (MBE). In semiconductor processing in general, phosphorus is employed in the form of a gas compound, typically $PH_3$ or $PCl_3$. These gases are hazardous, and the trend in semiconductor processing technology is toward in situ generation of hazardous gases, including arsine, phosphine, and the halogenated forms of phosphorus and arsenic. For in situ generation, the precursors are typically the elements arsenic and phosphorus which, while toxic themselves, pose less risk in handling and storing than the gas compounds.

Elemental phosphorus is known to occur in three allotropic forms, white, red and black. White phosphorus is a highly toxic substance by all routes of exposure. It ignites spontaneously and burns forming an acrid white vapor that is dangerous to the eyes and respiratory tract. It autoignites at 29° C., and under some circumstances at even lower temperatures, and therefore must be stored and handled with great care.

Red phosphorus is less reactive, and less toxic, than white phosphorus. However, red phosphorus typically contains white phosphorus as an impurity, and itself autoignites at elevated temperatures. It also reacts readily with water at elevated temperatures to form toxic phosphine. Consequently there are strict handling and storage regulations for red phosphorus which increase the cost of this material and limit use of red phosphorus as a commercial reagent.

Black phosphorus resembles graphite in texture and has an uncommon layered crystal structure, with layers of one atom bonded to three atoms. The important technological feature of black phosphorus is that it is relatively stable and inert, and difficult to ignite in air. Thus it can be stored and handled with low risk. However, the known techniques for synthesizing black phosphorus are based on the conversion of white phosphorus at very high pressure. A process that uses white phosphorus at very high pressure is itself extremely hazardous. If a process was available for safely producing black phosphorus it could become an important precursor material in semiconductor technology, thus reducing a source of risk and concern to both technologists and environmentalists.

STATEMENT OF THE INVENTION

We have developed a technique for preparing black phosphorus that is safe and effective. It is based on the conversion of amorphous red phosphorus to black phosphorus at low pressure and moderately elevated temperature. We have discovered that when red phosphorus is thermally cycled a sufficient number of times it undergoes a dramatic phase change from red to black. For added safety, conversion is effected in a three stage conversion cell.

DETAILED DESCRIPTION

Figure 1:
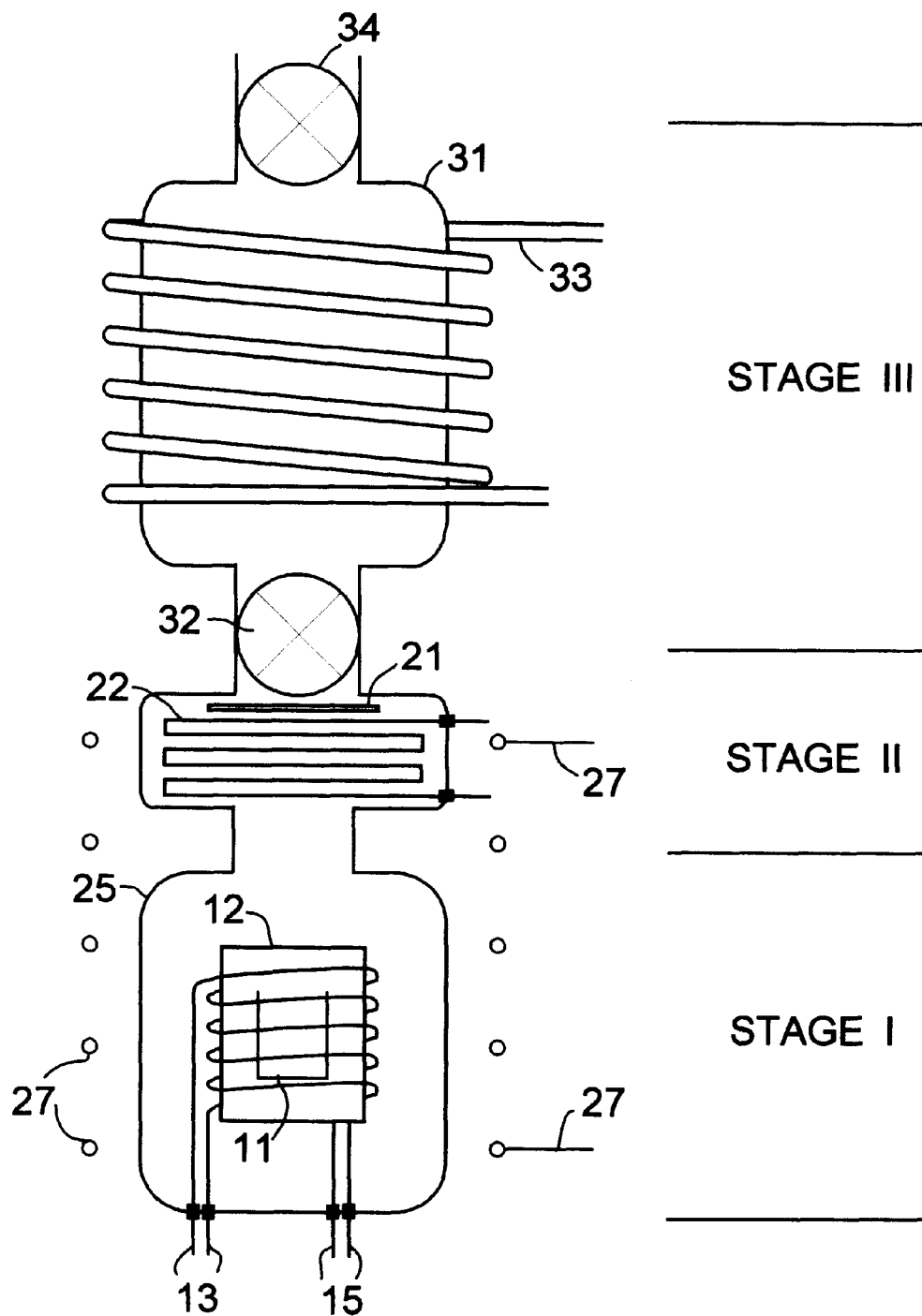
FIG. 1 is a diagram of the three stage conversion cell used for the process of the invention.

FIG. 1 shows a three stage conversion cell for carrying out the process of the invention. The first and second stages are contained within a sealed, high vacuum, metal container. The first stage, STAGE I, is an oven, and the second stage, STAGE II, is a heated baffle. These stages are contained within a common vacuum chamber. The third stage, STAGE III, is a separate high vacuum container connected to the second stage by way of a high-vacuum valve. In FIG. 1, the initial elemental phosphorus charge is placed in container 11 in STAGE I. The container may be any suitable inert container, e.g. BN or Ti plated stainless steel. The container is placed in oven 12, provided with heating coil 13. The temperature in the oven is sensed with a thermocouple, indicated by leads 15, which is used to monitor the temperature in the oven and may be connected to a feedback control for heating coil 13.

The second stage, STAGE II, is a fracture stage where $P_4$ vapors from STAGE I are converted to $P_2$. This stage comprises one or more baffles 21, and a STAGE II heating element 22. The heating element is preferably made of tantalum, and has a large surface area. Tantalum catalyzes the conversion of $P_4$ to $P_2$ and therefore allows the baffle to function effectively at lower heating element temperatures. STAGE I and STAGE II are contained within a common vacuum chamber 25. A separate heating coil, indicated schematically at 27, is provided for vacuum chamber 25 for the purpose of purging the apparatus prior to initiating the process.

STAGE III is a condenser stage, comprising a separate high vacuum chamber 31, connected to STAGE II via high vacuum valve 32. Chamber 31 is provided with a cooling coil 33, and an exhaust valve 34. The function of STAGE III is to condense phosphorus vapor and prevent emission of dangerous vapor to the atmosphere. Periodically, it may be desirable to shut down STAGE III and vent the vapors using a controlled burn.

The conversion process of the invention proceeds as follow.

The container 11 is charged with amorphous red phosphorus. The charge may be any size and may be a single piece or multiple pieces. The vacuum chamber 25 is then evacuated to a very low pressure, e.g. $<1 \times 10^{-7}$ Torr, and preferably $<1 \times 10^{-8}$ Torr. The vacuum is conveniently pulled through exhaust valve 34 in STAGE III chamber. Before initiating thermal cycling it is generally beneficial to purge the apparatus by outgassing the chambers and evaporating volatile impurities from the phosphorus source material. This procedure involves opening valves 32 and 34, and heating STAGE I, by coil 13, and STAGE II, by coil, 22 to a temperature above 200° C., e.g. 250° C. or above. Chamber 25 is also heated using coil 27 to a temperature of approximately 200° C., or above, to prevent material being outgassed from condensing on the walls of the vacuum chamber. Heating for several hours is adequate to clean the apparatus. Valve 34 is then closed and thermal cycling initiated.

Thermal cycling involves heating the red phosphorus container 11 to a temperature above 350° C., and preferably in the range 360–400° C., with a ramp of preferably 5–20° C./min. The red phosphorus is allowed to cool to a temperature below 300° C., and preferably below 250° C., e.g.

200–240° C. The cooling rate may be comparable to, or more rapid than, the heating rate. This completes one cycle. The red phosphorus is thermally cycled in this manner for three cycles or more, at which point the phophorus undergoes a sharp allotropic phase change from red to black. The change typically occurs after 3–5 cycles but may occur later.

During thermal cycling in a vacuum, $P_4$ vapor is constantly emitted from the red phosphorus charge. This vapor is potentially hazardous. Fracture STAGE II is provided to reduce the hazard. As the $P_4$ vapor rises through STAGE II it is converted to $P_2$, the less hazardous form. STAGE III is provided to condense vapor that is unconverted in STAGE II. During the cool phase of the cycle, this vapor passes to STAGE III where it is condensed. Material condensed in the condenser is potentially hazardous and can be periodically burned, or the condenser can be removed and cleaned.

Figure 2:
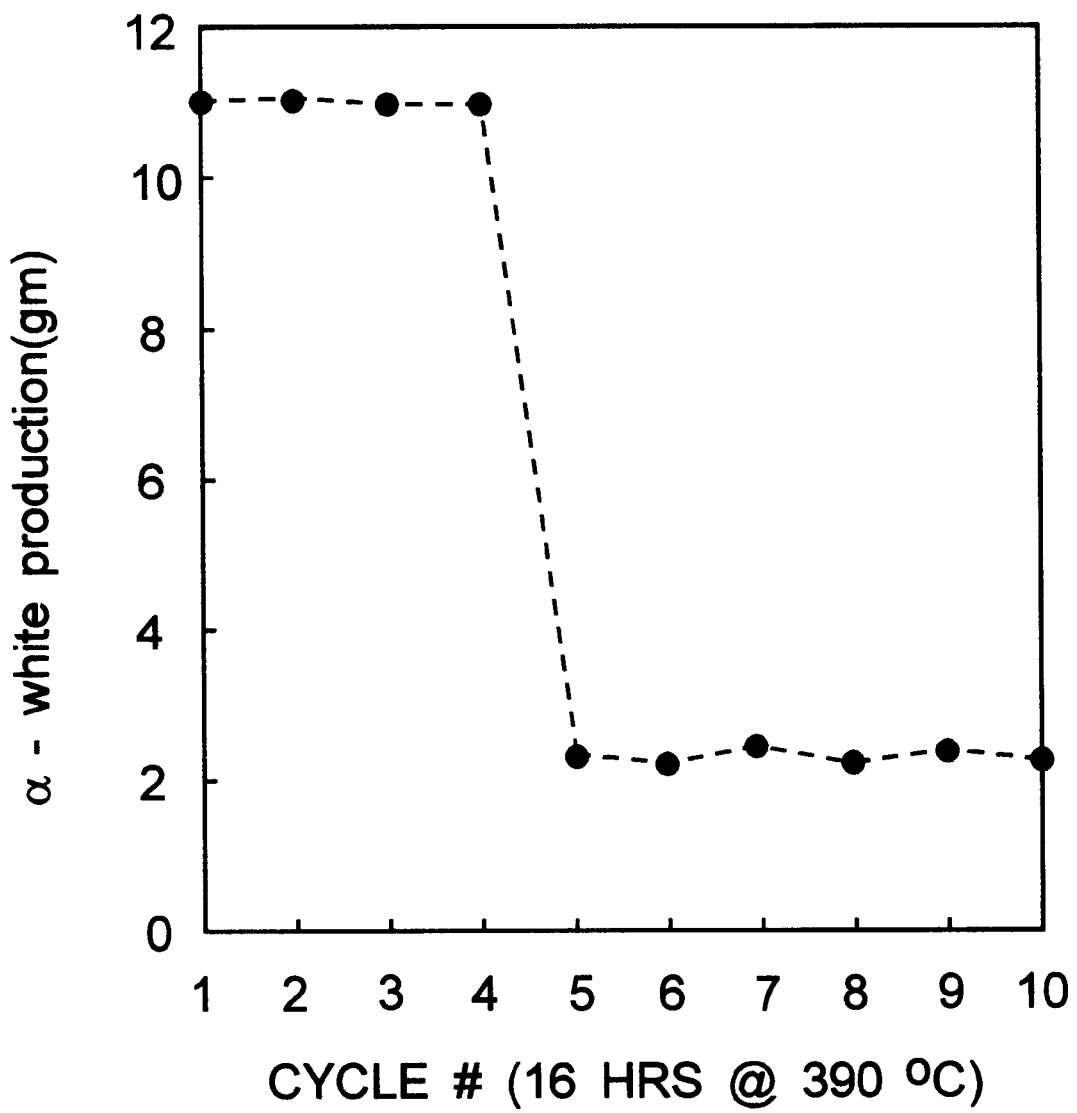
FIG. 2 is a plot of white phosphorus emission v. number of thermal cycles that can be used to signal a red to black phosphorus phase change.

The allotropic phase change from red phosphorus to black is accompanied by a dramatic decline in the amount of $P_4$ vapor emitted from the charge. This is shown in FIG. 2, where the amount (grams) of white phosphorus condensed from the $P_4$ vapor emitted by a 78 gram red phosphorus source is plotted vs. the number of thermal cycles. As seen, the drop in condensed white phosphorus after 4 cycles signals the phase change of the bulk of the charge from red to black. The emitted $P_4$ vapor can be monitored by a pressure gauge. This phase change is stable and irreversible under the conditions of the process.

Black phosphorus made by the process of the invention is safe to store and handle. When required, the black phosphorus can be converted back to red phosphorus, or even white phosphorus, for use in a semiconductor or other process. To convert black phosphorus to red, it can be heated, using the apparatus described above, to a temperature in excess of 430° C. The phase change back to red is characterized by a corresponding increase in $P_4$ vapor pressure.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. Method for producing black phosphorus from red phosphorus comprising the steps of:

(a) placing red phosphorus in a vacuum chamber, (b) evacuating the vacuum chamber to a pressure of $<1\times10^{-7}$ Torr, (c) heating the red phosphorus to a temperature above 350° C., (d) cooling the red phosphorus to a temperature below 300° C., (e) repeating steps (c) and (d) at least 3 times, and (f) removing black phosphorus from the vacuum chamber.

2. The method of claim 1 where said red phosphorus is heated to a temperature in the range 360–400° C.

3. The method of claim 2 wherein the vacuum chamber is evacuated to a pressure of $<1\times10^{-8}$.

4. The method of claim 3 wherein the red phosphorus is cooled in step (d) to a temperature in the range 200–240° C.

5. The method of claim 4 wherein $P_4$ vapor from the heated red phosphorus are converted to $P_2$ vapor by contact with a heated baffle.

6. The method of claim 5 wherein excess vapor from said vacuum chamber is condensed in a condenser attached to said vacuum chamber.

7. The method of claim 2 wherein said temperature is reached by ramping at a rate in the range 5–20° C./min.

* * * * *